United States Patent
Massaro, Jr.

(10) Patent No.: US 9,643,438 B2
(45) Date of Patent: May 9, 2017

(54) PRINTER CARTRIDGE PIN EXPOSURE AND REMOVAL APPARATUS

(71) Applicant: FLO-TECH, LLC, Middletown, CT (US)

(72) Inventor: Peter Vincent Massaro, Jr., West Haven, CT (US)

(73) Assignee: Flo-Tech, LLC, Middletown, CT (US)

( * ) Notice: Subject to any disclaimer, the term of this patent is extended or adjusted under 35 U.S.C. 154(b) by 190 days.

(21) Appl. No.: 14/324,499

(22) Filed: Jul. 7, 2014

(65) Prior Publication Data

US 2015/0306884 A1  Oct. 29, 2015

Related U.S. Application Data

(60) Provisional application No. 61/985,282, filed on Apr. 28, 2014.

(51) Int. Cl.
| | |
|---|---|
| *B23B 39/22* | (2006.01) |
| *B41J 29/02* | (2006.01) |
| *B41J 2/175* | (2006.01) |
| *B23B 51/04* | (2006.01) |

(52) U.S. Cl.
CPC ............ *B41J 29/02* (2013.01); *B41J 2/1752* (2013.01); *B23B 39/22* (2013.01); *B23B 51/044* (2013.01)

(58) Field of Classification Search
CPC ............ Y10T 408/378; Y10T 408/375; Y10T 408/3792; Y10T 408/3796; Y10T 408/38; Y10T 408/3806; Y10T 408/50; Y10T 408/5626–408/5628; Y10T 408/563; Y10T 408/675; Y10T 408/6757; Y10T 408/893; B23B 39/22; B23B 51/044;
(Continued)

(56) References Cited

U.S. PATENT DOCUMENTS

| 105,488 A | * | 7/1870 | Parker | B23B 39/22 |
|---|---|---|---|---|
| | | | | 408/37 |
| 337,924 A | * | 3/1886 | Chase | A43D 21/125 |
| | | | | 12/8.5 |

(Continued)

FOREIGN PATENT DOCUMENTS

GB   191025122 A  *  9/1911

*Primary Examiner* — Sunil K Singh
*Assistant Examiner* — Ryan Rufo
(74) *Attorney, Agent, or Firm* — Bachman & LaPointe, P.C.

(57) ABSTRACT

A printer cartridge pin exposure and removal apparatus for the removal of embedded pins within a printer cartridge. The printer cartridge is positioned within a cartridge mount and securely held in a fixed position through a clamping mechanism. A first pin extracting mechanism and a second pin extracting mechanism are positioned about opposite ends of the printer cartridge. A first drill and a second drill are supported by and aligned with the printer cartridge through a first drill aligner and a second drill aligner respectively. The first drill aligner moves the first drill towards the printer cartridge, while the first drill drives a first drill bit in order to penetrate the printer cartridge. Similarly, the second drill aligner moves the second drill towards the printer cartridge, while the second drill drives a second drill bit in order to penetrate the opposite side of the printer cartridge.

18 Claims, 14 Drawing Sheets

(58) Field of Classification Search
CPC .. B23B 1/14; B23B 5/12; B23B 7/123; B23B 13/40
USPC ................. 408/203.5; 269/201, 228
See application file for complete search history.

(56) References Cited

U.S. PATENT DOCUMENTS

| | | | | |
|---|---|---|---|---|
| 661,554 A * | 11/1900 | Roberts | ............... | B27G 15/00 29/DIG. 67 |
| 1,905,133 A * | 4/1933 | Bishop | ............... | B23Q 5/268 138/31 |
| 2,049,444 A * | 8/1936 | Hirvonen | ............. | B23B 39/168 408/11 |
| 2,921,486 A * | 1/1960 | Burke | ............... | B25B 5/12 24/494 |
| 3,189,065 A * | 6/1965 | Cochrane | ............... | B23B 39/168 408/130 |
| 3,264,906 A * | 8/1966 | Swords | ............... | B23Q 1/0036 15/304 |
| 3,941,364 A * | 3/1976 | Hjelm | ............... | B25B 5/12 269/156 |
| 4,719,676 A * | 1/1988 | Sansone | ............... | B23B 3/30 29/26 A |
| 4,978,255 A * | 12/1990 | Gale | ............... | F16L 41/04 137/15.12 |
| 5,025,842 A * | 6/1991 | Brimhall | ............... | B23B 5/16 144/12 |
| 6,698,737 B1 * | 3/2004 | Blessing | ............... | B25B 5/003 269/16 |
| 7,044,690 B1 * | 5/2006 | Charvat | ............... | B23B 35/00 29/26 A |
| 2002/0020953 A1 * | 2/2002 | Kofod | ............... | B25B 5/12 269/228 |
| 2008/0008549 A1 * | 1/2008 | Schawe | ............... | B23G 1/02 409/66 |
| 2011/0150587 A1 * | 6/2011 | Stukuls | ............... | B23B 39/161 408/44 |
| 2014/0339753 A1 * | 11/2014 | Fukui | ............... | B25B 5/122 269/228 |
| 2014/0356086 A1 * | 12/2014 | Hirko | ............... | A23L 1/0073 408/1 R |

* cited by examiner

PRINTER CARTRIDGE PIN EXPOSURE AND REMOVAL APPARATUS

The current application claims a priority to the U.S. Provisional Patent application Ser. No. 61/985,282 filed on Apr. 28, 2014.

FIELD OF THE INVENTION

The present invention relates generally to an apparatus for removing embedded pins from depleted printer cartridges in a manner that allows the printer cartridge and the embedded pins to be reused.

BACKGROUND OF THE INVENTION

Used across the world in both homes and businesses, a large number printer cartridges are depleted and disposed of every day. In an attempt to decrease costs and in the interests of making the industry more environmentally friendly, an increasing number of businesses reuse printer cartridges to the best of their ability. In fact, many will pay for shipping in order to encourage customers to recycle empty cartridges instead of simply throwing them away. Not only does this allow manufacturers to reclaim much of the material originally used for construction of the printer cartridge, the printer cartridge itself can even be taken apart, refilled, and resold. This reduces the price for consumers as material costs are spread across reused iterations of the printer cartridge. Unfortunately, as many printer manufacturers obtain the majority of the profits from the sale of expendables (e.g. ink) rather than the printers themselves, there is little incentive for manufacturers to make cartridge reuse easy for others.

One obstacle in the reuse of printer cartridges is that the printer cartridge pin is difficult and time-consuming to access. The removal of cartridge pins is required to take apart the printer cartridge. Unfortunately, said cartridge pins are often obstructed by a welded plastic piece that is added by the original equipment manufacturer. In order to access the cartridge pin the welded plastic piece must be cut away without damaging the cartridge pin or its corresponding hole in the process. This makes tools such as drills less appealing as any mistakes can result in damage to the printer cartridge or cartridge pin, rendering them unsuitable for reuse; this is because damages result in defects of the reused printer cartridge, a common result of which is banding on printed pages.

To avoid such defects a knife, chisel, or similar tool can be used to cut away the welded plastic piece and expose the cartridge pin. While this method is much less likely to damage the printer cartridge or cartridge pin, it is also much more time consuming. Additionally, both methods of removal are non-repeatable, further reducing efficiency as more time is needed to prepare each individual printer cartridge for treatment.

Therefore it is an object of the present invention to provide an apparatus for extracting embedded pins from printer cartridges in a seamless and efficient manner. The present invention is adaptable to different types of printer cartridges through the provision of cartridge-specific inserts. A pneumatic system drills into the welded plastic in a manner that exposes the embedded pins without causing damage to the embedded pins or the printer cartridges. Once exposed, the embedded pins are then removed by the present invention, wherein the printer cartridge itself is ready for disassembly and reassembly.

DETAIL DESCRIPTIONS OF THE INVENTION

Figure 1:
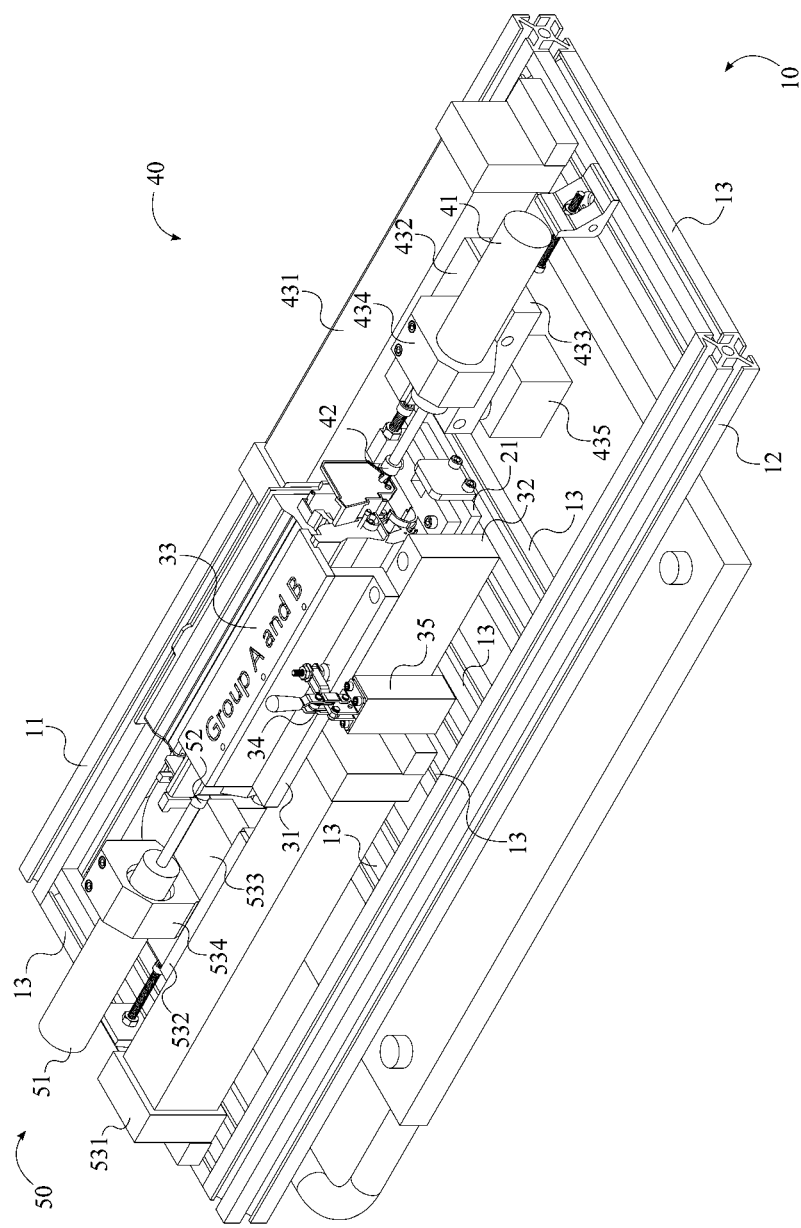
FIG. 1 is a perspective view of the present invention.

All illustrations of the drawings are for the purpose of describing selected versions of the present invention and are not intended to limit the scope of the present invention.

The present invention is a printer cartridge pin exposure and removal apparatus for the removal of embedded pins within printer cartridges. More specifically, the embedded pins within the waste hopper, although the present invention can be adjusted to target embedded pins in other sections of a printer cartridge as well. The present invention comprises a supporting structure 10, a cartridge mount 20, a clamping mechanism 30, a first pin extracting mechanism 40, and a second pin extracting mechanism 50.

Figure 2:
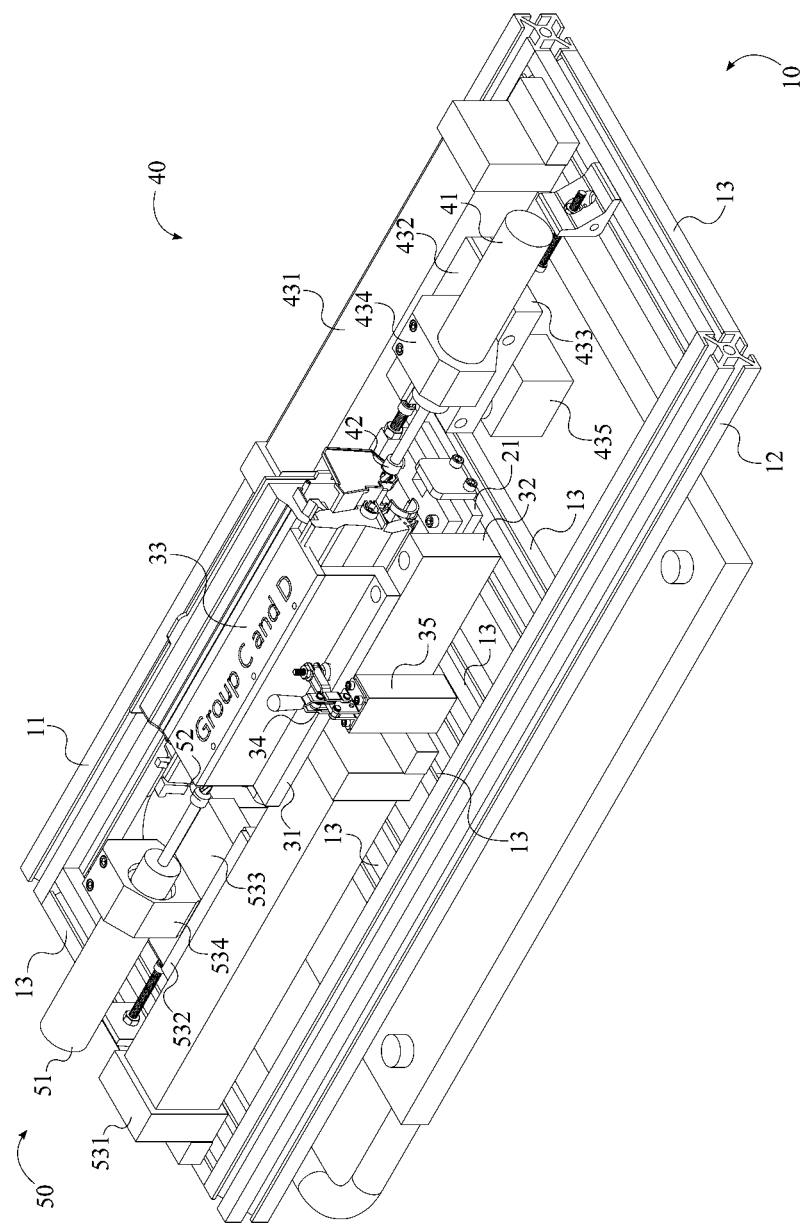
FIG. 2 is a perspective view of the present invention designed to hold an alternative printer cartridge.

In reference to FIG. 1-2, the cartridge mount 20, the clamping mechanism 30, the first pin extracting mechanism 40, and the second pin extracting mechanism 50 are slidably connected to the supporting structure 10. The cartridge mount 20 supports a printer cartridge, while the clamping mechanism 30 is positioned adjacent to the cartridge mount 20 and acts to hold the printer cartridge in place within the cartridge mount 20. The cartridge mount 20 and the clamping mechanism 30 are positioned in between the first pin extracting mechanism 40 and the second pin extracting mechanism 50, such that the first pin extracting mechanism 40 and the second pin extracting mechanism 50 can engage opposing sides of the printer cartridge.

In further reference to FIG. 1-2, the supporting structure 10 comprises a first slide mount 11, a second slide mount 12, and a plurality of cross slide mounts 13. The first slide mount 11, the second slide mount 12, and the plurality of cross slide mounts 13 provide attachments points for the other components of the present invention, wherein the components can be laterally positioned along the first slide mount 11, the second slide mount 12, or the plurality of cross slide mounts 13. The plurality of cross slide mounts 13 are positioned in between the first slide mount 11 and the second slide mount 12. Additionally, the plurality of cross members are perpendicularly connected to the first mount and the second slide mount 12, wherein each of the plurality of cross slide members is able to be slidably positioned in between the first slide mount 11 and the second slide mount 12.

Figure 3:
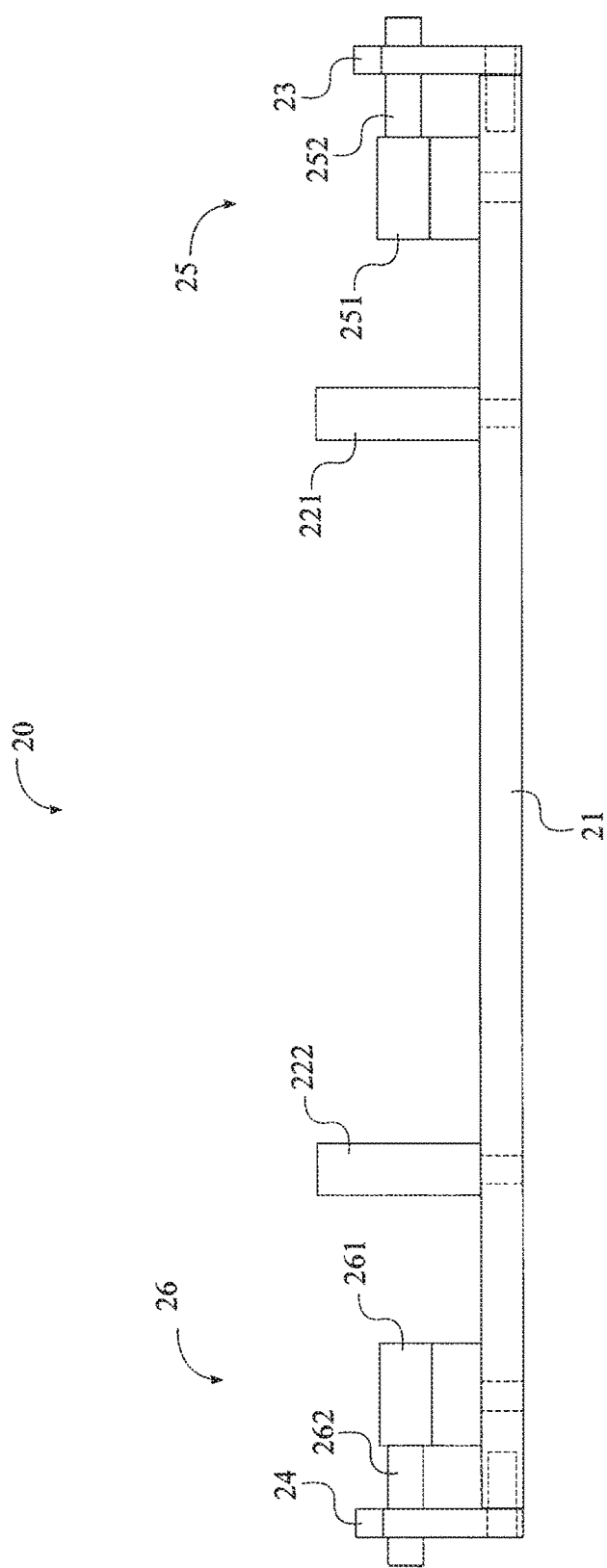
FIG. 3 is a front elevational view of the cartridge mount.

In reference to FIG. 3, the cartridge mount 20 comprises a base plate 21, a cartridge stand 22, a first cartridge end stopper 23, a second cartridge end stopper 24, a first hard stop 25, and a second hard stop 26. The base plate 21 is slidably connected to the supporting structure 10. More specifically, the base plate 21 is slidably connected to the plurality of cross slide mounts 13. The cartridge stand 22 is attached to the base plate 21 opposite the supporting structure 10 and is designed to receive a particular type of printer cartridge. As such, the cartridge stand 22 can be removed from the base plate 21 so that an alternate cartridge stand designed to support a printer cartridge having a different shape can be attached to the base plate 21.

Figure 4:
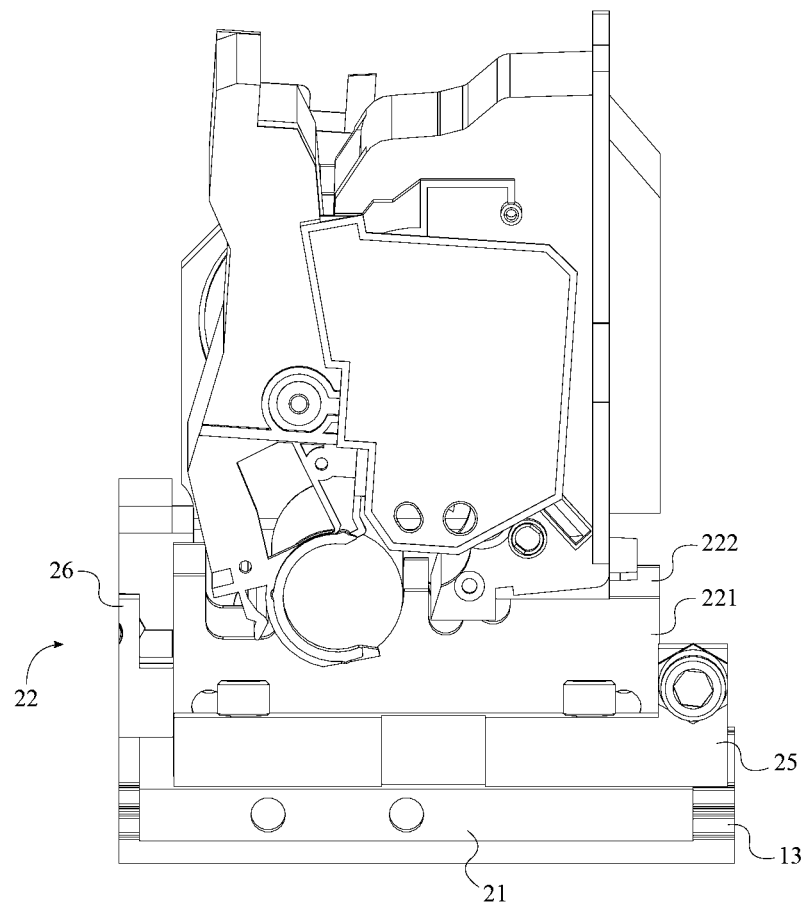
FIG. 4 is a right side view of a printer cartridge positioned within the cartridge stand.
Figure 5:
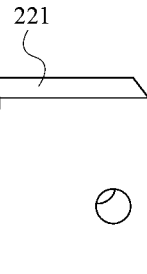
FIG. 5 is a perspective view of the cartridge stand.

In the preferred embodiment of the present invention, the cartridge stand 22 comprises a first stand 221 and a second stand 222, as shown in FIG. 4-5. The first stand 221 and the second stand 222 are each designed to receive one end of the printer cartridge, and as such, the first stand 221 and the second stand 222 are positioned opposite each other along the base plate 21. The first stand 221 and the second stand 222 are attached to the base plate 21 through a plurality of screws that are traversed up through the base plate 21 and into the first stand 221 and the second stand 222. In this way, the first stand 221 and the second stand 222 can readily be detached and replaced in order to accommodate printer cartridges of various designs.

In reference to FIG. 3, the first cartridge end stopper 23 and the second cartridge end stopper 24 are adjacently connected to the base plate 21, wherein the first cartridge end stopper 23 and the second cartridge end stopper 24 are positioned opposite each other along the base plate 21. Similarly, the first hard stop 25 and the second hard stop 26 are adjacently connected to the base plate 21, wherein the first hard stop 25 and the second hard stop 26 are positioned opposite each other along the base plate 21. More specifically, the first hard stop 25 is positioned in between the first cartridge end stopper 23 and the cartridge stand 22, while the second hard stop 26 is positioned in between the second cartridge end stopper 24 and the cartridge stand 22.

The first cartridge end stopper 23 and the second cartridge end stopper 24 ensure that the printer cartridge is positioned within the confines of the base plate 21, such that the printer cartridge is properly aligned at the correct distance from the first pin extractor 422 and the second pin extractor 522. The first hard stop 25 and the second hard stop 26 ensure that the first pin extractor 422 and the second pin extractor 522 do overly engage the printer cartridge, which could result in damage to the printer cartridge or the embedded pins. In reference to FIG. 3, the first hard stop 25 comprises a first stop mount 251 and a first variable stop 252, while the second hard top comprises a second stop mount 261 and a second variable stop 262. The first stop mount 251 is connected to the base plate 21 and the first variable stop 252 is positioned into the first stop mount 251, such that the first variable stop 252 extends outwards towards the first pin extractor 422. Similarly, the second stop mount 261 is connected to the base plate 21 and the second variable stop 262 is positioned into the second stop mount 261, such that the second variable stop 262 extends outwards towards the second pin extractor 522.

Figure 6:
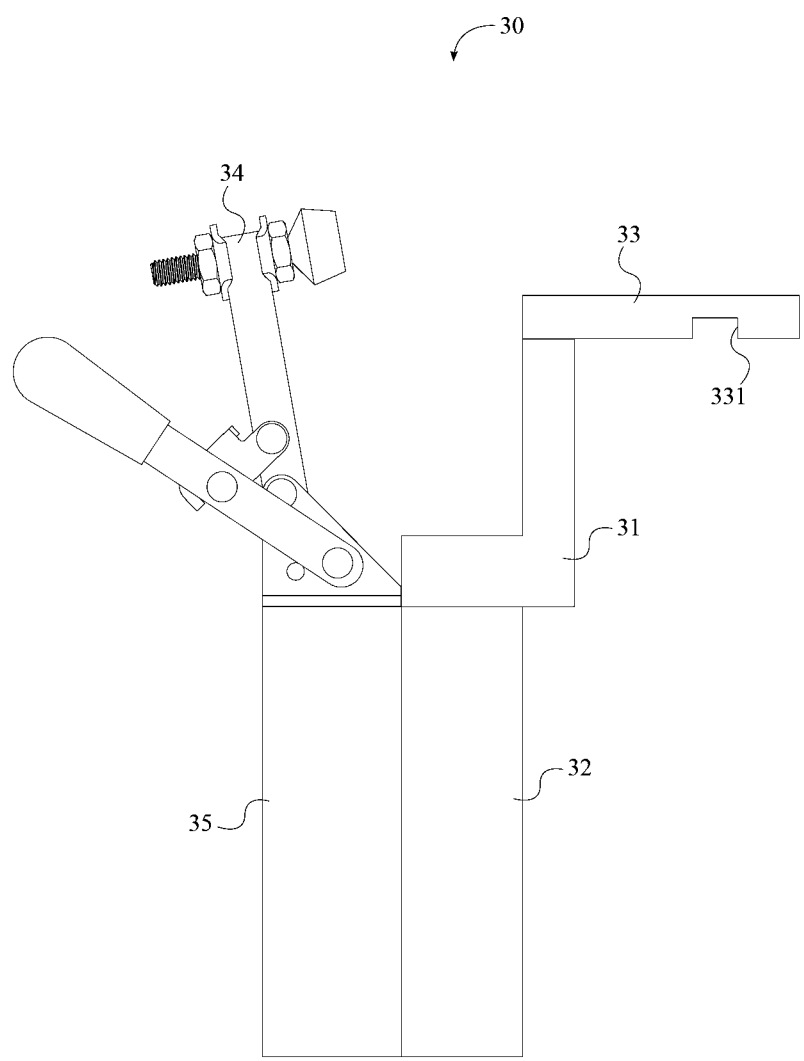
FIG. 6 is a right side elevational view of the clamping mechanism.

In reference to FIG. 6, the clamping mechanism 30 comprises a clamp arm 31, a clamp arm base 32, a clamp top 33, a toggle clamp 34, and a toggle clamp stand 35. The clamp arm base 32 is slidably connected to the supporting structure 10 and supports the clamp arm 31 and the clamp top 33. More specifically, the clamp arm base 32 is slidably connected to the plurality of cross slide mounts 13. The clamp arm 31 is adjacently attached to the clamp arm base 32 opposite the supporting structure 10, while the clamp top 33 is perpendicularly connected to the clamp arm 31. The clamp top 33 comprises a cartridge notch 331 that traverses along the length of the clamp top 33.

In reference to FIG. 1, the clamp arm base 32 is positioned flush against the base plate 21 and the printer cartridge is positioned within the cartridge stand 22. The clamp arm 31 is then attached to the clamp arm base 32, such that the clamp top 33 is positioned along the top of the printer cartridge. A portion of the printer cartridge is positioned into the cartridge notch 331 of the clamp top 33, such that the printer cartridge is securely held in place and will not move front to back within the cartridge stand 22. The clamp top 33 is designed for use with a particular type of printer cartridge.

In further reference to FIG. 1, similar to the clamp arm base 32, the toggle clamp stand 35 is slidably connected to the supporting structure 10. More specifically, the toggle clamp stand 35 is slidably connected to the plurality of cross slide mounts 13. The toggle clamp 34 is adjacently connected to the toggle clamp stand 35 opposite the supporting structure 10. The toggle clamp stand 35 is positioned flush against the clamp arm base 32, such that the clamp arm base 32 is positioned in between the toggle clamp stand 35 and the base plate 21. The toggle clamp 34 can then be made to engage the clamp arm 31, wherein the clamp arm 31 is clamped in between the toggle clamp 34 and the clamp arm base 32. The toggle clamp 34 is engaged and disengaged through a lever, such that the clamp arm 31 can readily be released in order to exchange the clamp arm 31 and clamp top 33 to accommodate printer cartridges of various designs. It is also possible for the clamp arm 31 to be secured to the clamp arm base 32 through a plurality of screws or other fasteners in addition to or in place of the toggle clamp 34.

In reference to FIG. 1, the first pin extracting mechanism 40 comprises a first drill 41, a first drill bit 42, and a first drill aligner 43. The first drill aligner 43 is slidably connected to the supporting structure 10 and supports the first drill 41, wherein the first drill 41 is adjacently connected to the first drill aligner 43. More specifically, the first drill aligner 43 is slidably connected to the plurality of cross slide mounts 13.

The first drill bit 42 is adjacently attached to the first drill 41, wherein the first drill bit 42 is rotatably driven by the first drill 41. In the preferred embodiment of the present invention, the first drill 41 is pneumatically driven, however, any other mechanism may be used to drive the first drill 41.

Figure 25:
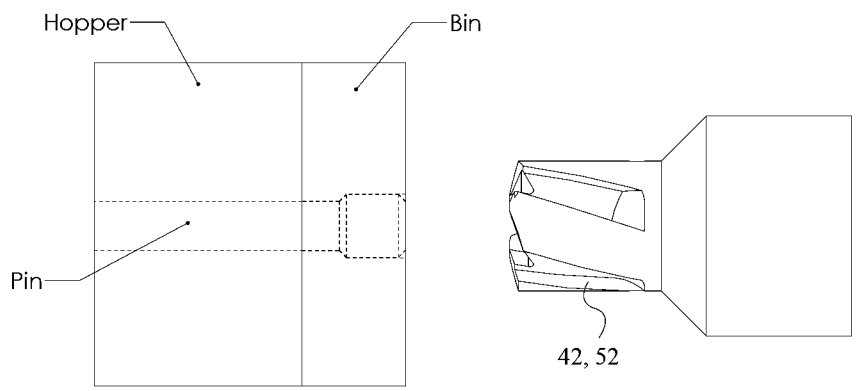
FIG. 25 is a diagram depicting an embedded pin before the first drill bit or the second drill bit has penetrated the printer cartridge.
Figure 26:
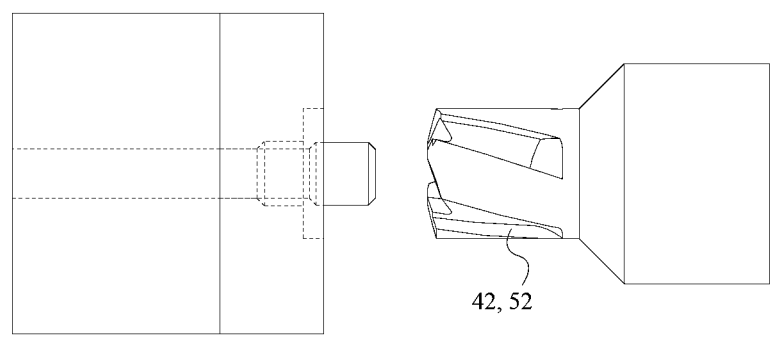
FIG. 26 is a diagram depicting the embedded pin being partially extracted after the first drill bit or the second drill bit has penetrated the printer cartridge.

The first drill bit 42 comprises a first bit inner cavity 421 and a first pin extractor 422, wherein the first drill bit 42 has an inner diameter and an outer diameter being compatible with the embedded pins and the printer cartridge. The outer surface of the first drill bit 42 has a stack cut, such that the first drill bit 42 is able to penetrate the printer cartridge as the first drill bit 42 is driven by the first drill 41. As depicted by FIG. 25-26, as the first drill bit 42 penetrates the printer cartridge, the first drill bit 42 traverses around the embedded pin, wherein the embedded pin is positioned into the inner cavity and extracted from the printer cartridge as the first drill bit 42 is pulled away from the printer cartridge.

Figure 8:
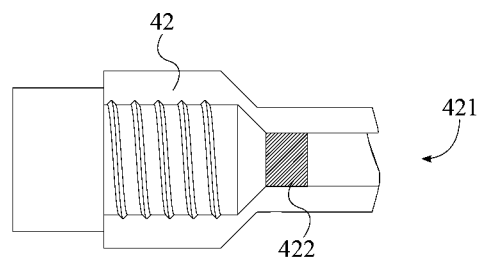
FIG. 8 is a sectional view of the first drill bit, wherein the first pin extractor is a magnet.
Figure 9:
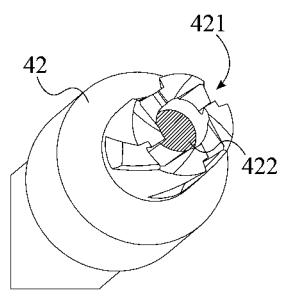
FIG. 9 is a perspective view thereof.
Figure 10:
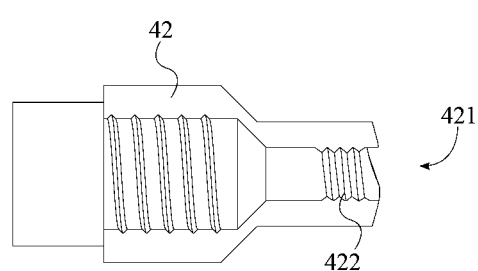
FIG. 10 is a sectional view of the first drill bit, wherein the first pin extractor is a threading.
Figure 11:
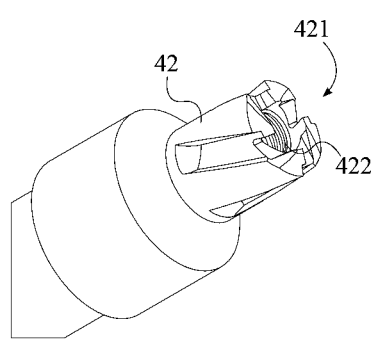
FIG. 11 is a perspective view thereof.
Figure 12:
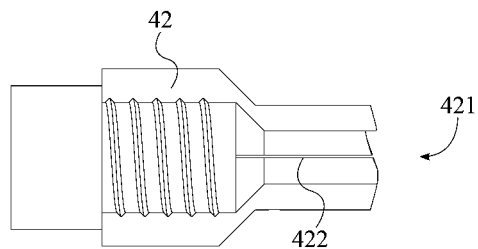
FIG. 12 is a sectional view of the first drill bit, wherein the first pin extractor is a collet.
Figure 13:
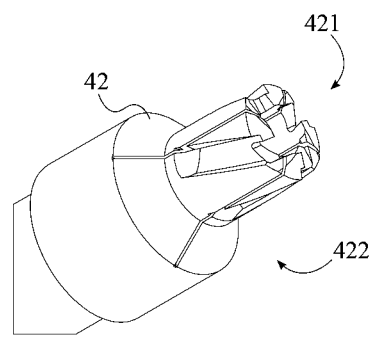
FIG. 13 is a perspective view thereof.
Figure 14:
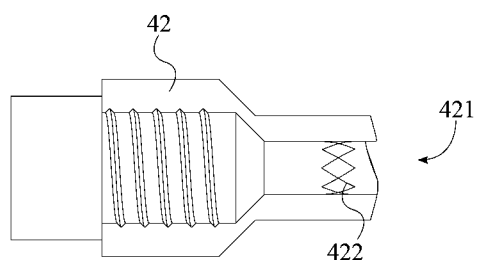
FIG. 14 is a sectional view of the first drill bit, wherein the first pin extractor is a knurling.
Figure 15:
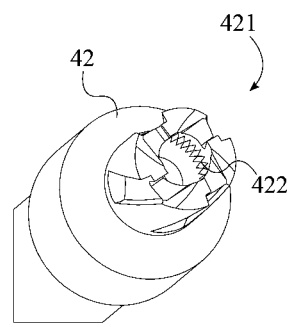
FIG. 15 is a perspective view thereof.

The first pin extractor 422 is integrated into the first drill bit 42 about the first bit inner cavity 421 and provides a means for extracting the embedded pin once the first drill 41 has penetrated the printer cartridge. In one embodiment, the first pin extractor 422 is a magnet, wherein the magnet is positioned within the first bit inner cavity 421, as shown in FIG. 8-9. In another embodiment, the first pin extractor 422 is in the form of a collet fashioned into the first drill bit 42 about the first bit inner cavity 421, as shown in FIG. 12-13. In another embodiment, the first pin extractor 422 is in the form of a threading about the first bit inner cavity 421, as shown in FIG. 10-11. In yet another embodiment, the first pin extractor 422 is in the form of a knurling about the first bit inner cavity 421, as shown in FIG. 14-15.

Figure 7:
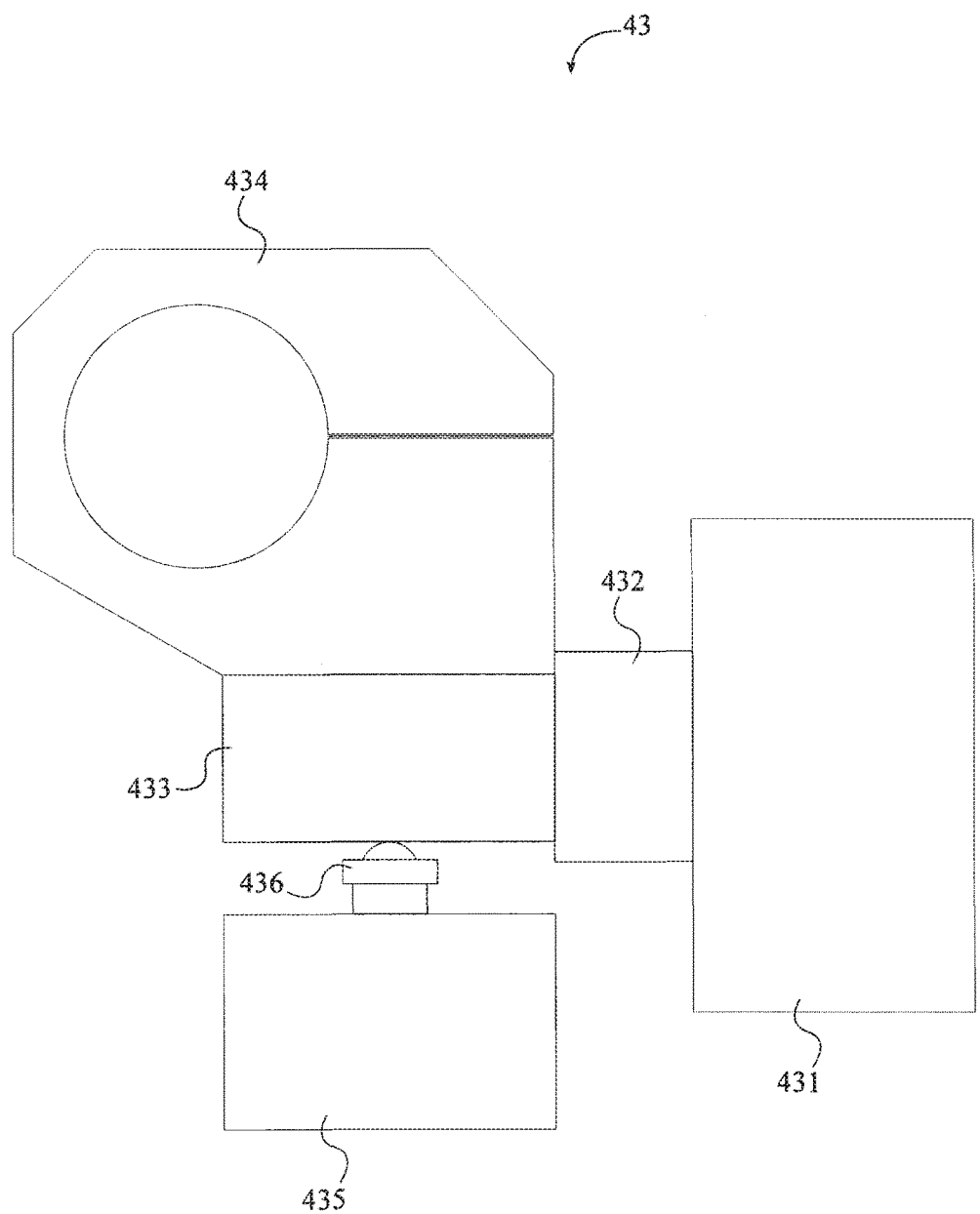
FIG. 7 is a right side elevational view of the first pin extracting mechanism.

In reference to FIG. 7, the first drill aligner 43 comprises a first rodless cylinder 431, a first rail mount 433, a first drill mount 434, a first ball transfer mount 435, and at least one first stud-mount ball transfer 436. The first rodless cylinder 431 supports the first rail mount 433 and the first drill mount 434 and is slidably connected to the supporting structure 10. More specifically, the first rodless cylinder 431 is slidably connected to the plurality of cross slide mounts 13. The first rail mount 433 is adjacently connected to the first rodless cylinder 431, such that the first rail mount 433 is positioned adjacent to a first end of the printer cartridge. The first drill mount 434 is adjacently connected to the first rail mount 433 opposite the first rodless cylinder 431.

In reference to FIG. 1, the first rodless cylinder 431 is positioned flush against the base plate 21, parallel to the length of the printer cartridge. The first rodless cylinder 431 comprises a first moving assembly 432 to which the first rail mount 433 is connected, such that the first rail mount 433 may laterally traverse along the first rodless cylinder 431. The first drill 41 is adjacently connected to the first drill mount 434, such that the first drill 41 is aligned perpendicular with the first end of the printer cartridge. The first moving assembly 432 can then be actuated in order to direct the first drill 41 towards or away from the printer cartridge. In the preferred embodiment of the present invention, the first moving assembly 432 is pneumatically operated, however, any other mechanism type can be used to operate the first moving assembly 432.

The at least one first stud-mount ball transfer 436 is adjacently connected to the first ball transfer mount 435. The first ball transfer mount 435 is positioned on the same surface as the supporting structure 10, beneath the first rail mount 433. The first rail mount 433 slidably engages the at least one first stud-mount ball transfer 436, such that the first rail mount 433 is supported and stabilized as the first moving assembly 432 drives the first rail mount 433, as shown in FIG. 7. The first variable stop 252 of the first hard stop 25 determines the distance that the first moving assembly 432 can travel, and thus determines the depth at which the printed cartridge is drilled, by adjusting the depth at which the first variable stop 252 is positioned into the first stop mount 251. The first variable stop 252 engages either a portion of the moving assembly of the first rodless cylinder 431 or a portion of the first rail mount 433.

In reference to FIG. 1, the second pin extracting mechanism 50 comprises a second drill 51, a second drill bit 52, and a second drill aligner 53. The second drill aligner 53 is slidably connected to the supporting structure 10 and supports the second drill 51, wherein the second drill 51 is adjacently connected to the second drill aligner 53. More specifically, the second drill aligner 53 is slidably connected to the plurality of cross slide mounts 13. The second drill bit 52 is adjacently attached to the second drill 51, wherein the second drill bit 52 is rotatably driven by the second drill 51. In the preferred embodiment of the present invention, the second drill 51 is pneumatically driven, however, any other mechanism may be used to drive the second drill 51.

The second drill bit 52 comprises a second bit inner cavity 521 and a second pin extractor 522, wherein the second drill bit 52 has an inner diameter and an outer diameter being compatible with the embedded pins and the printer cartridge. The outer surface of the second drill bit 52 has a stack cut, such that the second drill bit 52 is able to penetrate the printer cartridge as the second drill bit 52 is driven by the second drill 51. As depicted by FIG. 25-26, as the second drill bit 52 penetrates the printer cartridge, the second drill bit 52 traverses around the embedded pin, wherein the embedded pin is positioned into the inner cavity and extracted from the printer cartridge as the second drill bit 52 is pulled away from the printer cartridge.

Figure 17:
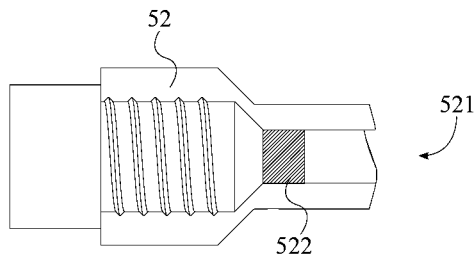
FIG. 17 is a sectional view of the second drill bit, wherein the second pin extractor is a magnet.
Figure 18:
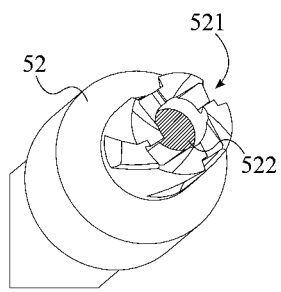
FIG. 18 is a perspective view thereof.
Figure 19:
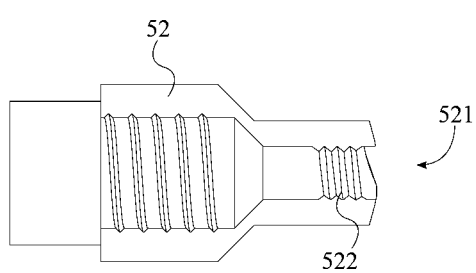
FIG. 19 is a sectional view of the second drill bit, wherein the second pin extractor is a threading.
Figure 20:
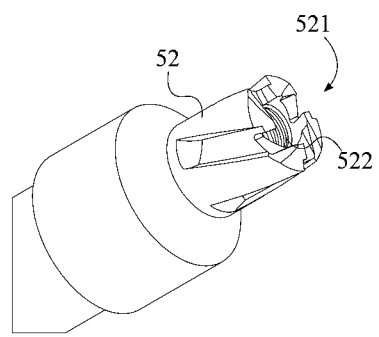
FIG. 20 is a perspective view thereof.
Figure 21:
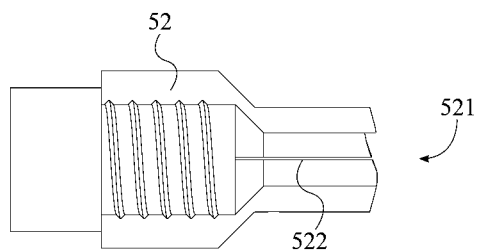
FIG. 21 is a sectional view of the second drill bit, wherein the second pin extractor is a collet.
Figure 22:
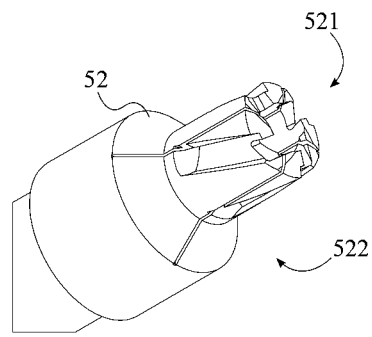
FIG. 22 is a perspective view thereof.
Figure 23:
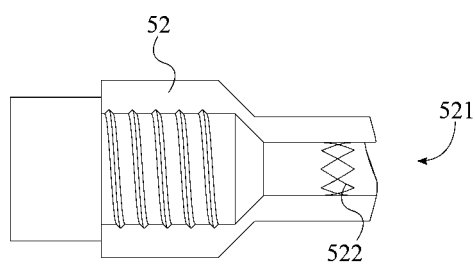
FIG. 23 is a sectional view of the second drill bit, wherein the second pin extractor is a knurling.
Figure 24:
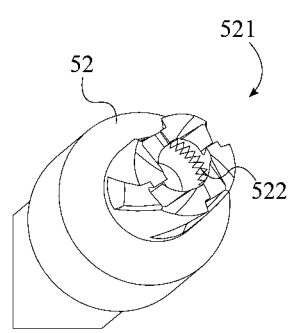
FIG. 24 is a perspective view thereof.

The second pin extractor 522 is integrated into the second drill bit 52 about the second bit inner cavity 521 and provides a means for extracting the embedded pin once the second drill 51 has penetrated the printer cartridge. In one embodiment, the second pin extractor 522 is a magnet, wherein the magnet is positioned within the second bit inner cavity 521, as shown in FIG. 17-18. In another embodiment, the second pin extractor 522 is in the form of a collet fashioned into the second drill bit 52 about the second bit inner cavity 521, as shown in FIG. 21-22. In another embodiment, the second pin extractor 522 is in the form of a threading about the second bit inner cavity 521, as shown in FIG. 19-20. In yet another embodiment, the second pin extractor 522 is in the form of a knurling about the second bit inner cavity 521, as shown in FIG. 23-24.

Figure 16:
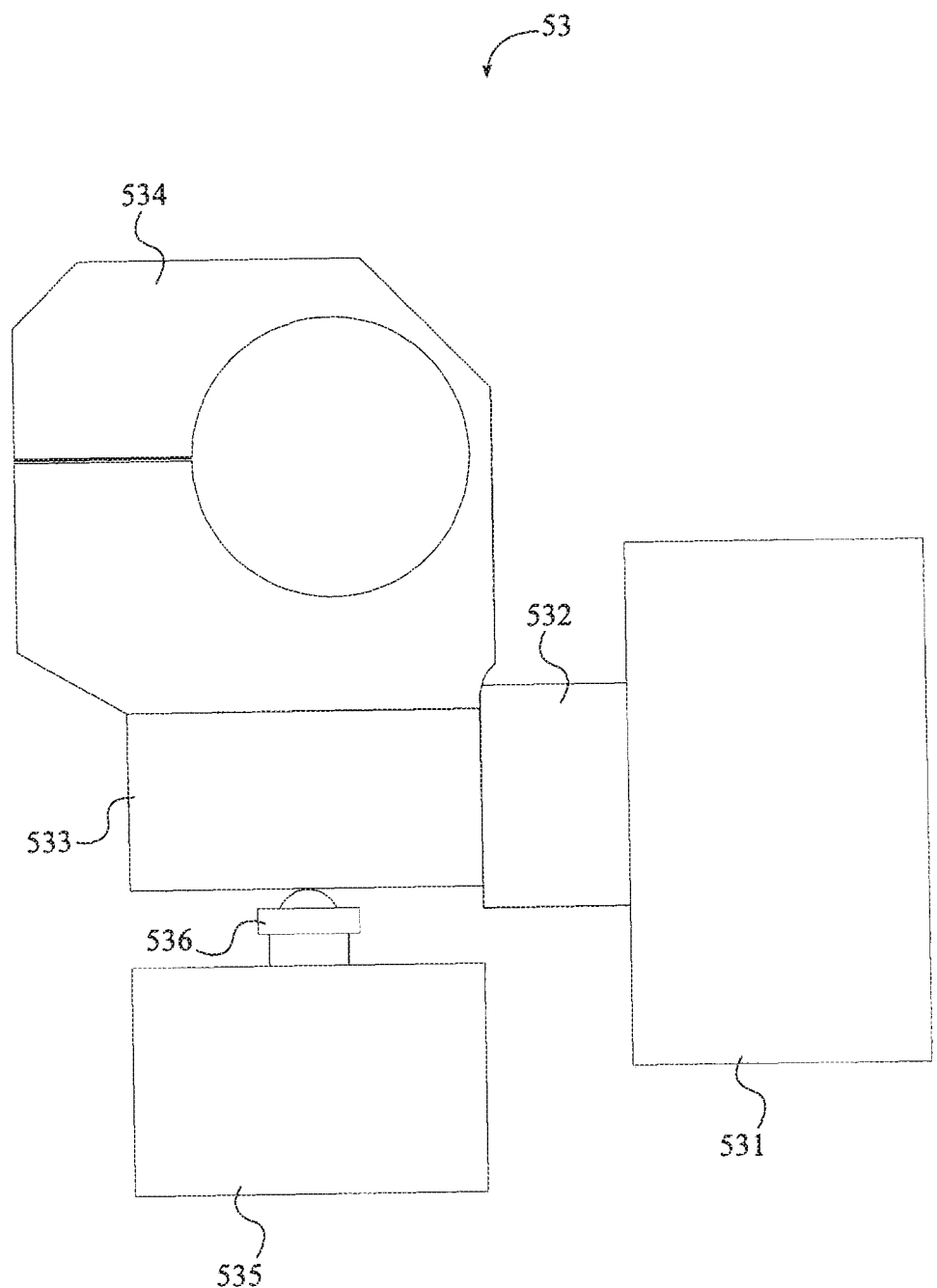
FIG. 16 is a left side elevational view of the second pin extracting mechanism.

In reference to FIG. 16, the second drill aligner 53 comprises a second rodless cylinder 531, a second rail mount 533, a second drill mount 534, a second ball transfer mount 535, and at least one second stud-mount ball transfer 536. The second rodless cylinder 531 supports the second rail mount 533 and the second drill mount 534 and is slidably connected to the supporting structure 10. More specifically, the second rodless cylinder 531 is slidably connected to the plurality of cross slide mounts 13. The second rail mount 533 is adjacently connected to the second rodless cylinder 531, such that the second rail mount 533 is positioned adjacent to a second end of the printer cartridge. The second drill mount 534 is adjacently connected to the second rail mount 533 opposite the second rodless cylinder 531.

In reference to FIG. 1, the second rodless cylinder 531 is positioned flush against the base plate 21, parallel to the length of the printer cartridge. The second rodless cylinder 531 comprises a second moving assembly 532 to which the second rail mount 533 is connected, such that the second rail mount 533 may laterally traverse along the second rodless cylinder 531. The second drill 51 is adjacently connected to the second drill mount 534, such that the second drill 51 is aligned perpendicular with the second end of the printer cartridge. The second moving assembly 532 can then be actuated in order to direct the second drill 51 towards or away from the printer cartridge. In the preferred embodiment of the present invention, the second moving assembly 532 is pneumatically operated, however, any other mechanism type can be used to operate the second moving assembly 532.

The at least one second stud-mount ball transfer 536 is adjacently connected to the second ball transfer mount 535. The second ball transfer mount 535 is positioned on the same surface as the supporting structure 10, beneath the second rail mount 533. The second rail mount 533 slidably engages the at least one second stud-mount ball transfer 536, such that the second rail mount 533 is supported and stabilized as the second moving assembly 532 drives the second rail mount 533, as shown in FIG. 16. The second variable stop 262 of the second hard stop 26 determines the distance that the second moving assembly 532 can travel, and thus determines the depth at which the printed cartridge is drilled, by adjusting the depth at which the second variable stop 262 is positioned into the second stop mount 261. The second variable stop 262 engages either a portion of the second moving assembly 532 or a portion of the second rail mount 533.

A computer system operates the first pin extracting mechanism 40 and the second pin extracting mechanism 50 in order to minimize the chances of a drilling mishap (e.g. damaging the cartridge pin). A user can input relevant parameters into the computer system, ensuring that the right instructions are being parsed for the specific printer cartridge and the type of first pin extractor 422 and second pin extractor 522 being used at any given time. As previously referenced, this automation reduces the chances of human error occurring, thus increasing effectiveness of the present invention.

Figure 27:
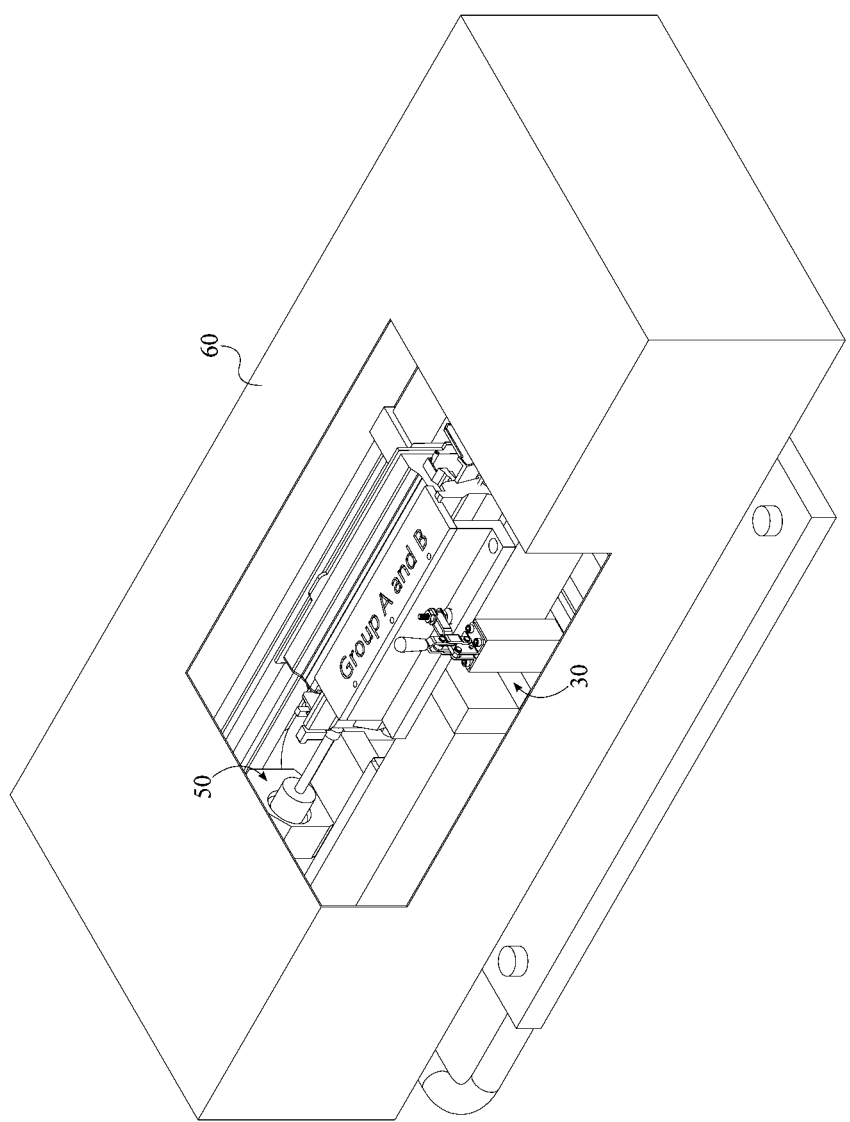
FIG. 27 is a perspective view of the present invention, wherein the hood is in place around the supporting structure, the cartridge mount, the clamping mechanism, the first pin extracting mechanism, and the second pin extracting mechanism.

The present invention further comprises a safety hood 60, in which the supporting structure 10, the cartridge mount 20, the clamping mechanism 30, the first pin extracting mechanism 40, and the second pin extracting mechanism 50 are positioned, as shown in FIG. 27. The safety hood 60 covers the moving parts of the present invention in order to prevent an individual from sticking any body parts in or near the working machinery, which could result is loss of or injury to said body parts. Additionally, the present invention further comprises an anti-tie down control 70. The anti-tie down control 70 is electronically connected to both the first pin extracting mechanism 40 and the second pin extracting mechanism 50. The anti-tie down control 70 features a timer that requires a user to press multiple operating controls within a short period of time in order to operate the first pin extracting mechanism 40 and the second pin extracting mechanism 50. This prevents the practice of tying down a single operating control, such that the machinery can be operated with a single hand.

Although the invention has been explained in relation to its preferred embodiment, it is to be understood that many other possible modifications and variations can be made without departing from the spirit and scope of the invention as hereinafter claimed.

What is claimed is:

1. A printer cartridge pin exposure and removal apparatus comprises: a supporting structure;
a cartridge mount;
a clamping mechanism;
a first pin extracting mechanism;
a second pin extracting mechanism;
the cartridge mount comprises a base plate and a cartridge stand;
the first pin extracting mechanism comprises a first drill, a first drill bit,
and a first drill aligner;
the second pin extracting mechanism comprises a second drill, a second drill bit, and a second drill aligner;
the base plate, the clamping mechanism, the first drill aligner, and the second drill aligner being slidably connected to the supporting structure;
the clamping mechanism being positioned adjacent to the cartridge mount; the cartridge mount and the clamping mechanism being positioned in between the first pin extractor and the second pin extractor;
the cartridge stand being adjacently attached to the base plate opposite the supporting structure;
the first drill being adjacently connected to the first drill aligner; the first drill bit being adjacently attached to the first drill;
the second drill being adjacently connected to the second drill aligner; and the second drill bit being adjacently attached to the second drill, wherein the first drill aligner comprises a first rodless cylinder, a first rail mount, and a first drill mount;
the first rodless cylinder being slidably connected to the supporting structure;
the first rail mount being adjacently connected to the first rodless cylinder; the first drill mount being adjacently connected to the first rail mount opposite the first rodless cylinder;
the first drill being adjacently connected to the first drill mount;
the first drill aligner further comprises a first ball transfer mount and an at least one first stud-mount ball transfer;
the at least one first stud-mount ball transfer being adjacently connected to the first ball transfer mount; and
the first rail mount slidably engaging the at least one first stud-mount ball transfer.

2. The printer cartridge pin exposure and removal apparatus as claimed in claim 1 comprises:
the clamping mechanism comprises a clamp arm, a clamp arm base, and a clamp top;
the clamp arm base being slidably connected to the supporting structure;
the clamp arm being adjacently attached to the clamp arm base opposite the supporting structure; and
the clamp top being perpendicularly connected to the clamp arm.

3. The printer cartridge pin exposure and removal apparatus as claimed in claim 1 comprises:
the clamping mechanism comprises a toggle clamp and a toggle clamp stand;
the toggle clamp stand being slidably connected to the supporting structure; and
the toggle clamp being adjacently connected to the toggle clamp stand
opposite the supporting structure.

4. The printer cartridge pin exposure and removal apparatus as claimed in claim 1 comprises:
the clamping mechanism comprises a clamp arm, a clamp arm base, and a toggle clamp; and the clamp arm being coupled in between the toggle clamp and the clamp arm base.

5. The printer cartridge pin exposure and removal apparatus as claimed in claim 1 comprises:
the supporting structure comprises a first slide mount, a second slide mount, and a plurality of cross slide mounts;
the plurality of cross slide mounts being positioned in between the first slide mount and the second slide mount; and
the plurality of cross slide mounts being perpendicularly connected to the first slide mount and the second slide mount.

6. The printer cartridge pin exposure and removal apparatus as claimed in claim 1 comprises:
the first drill bit comprises a first bit inner cavity and a first pin extractor; and
the first pin extractor being integrated into the first drill bit about the first bit inner cavity.

7. The printer cartridge pin exposure and removal apparatus as claimed in claim 6 comprises:
the first pin extractor being selected from the group consisting of a magnet, a threading, a collet, a knurling, or a combination thereof.

8. The printer cartridge pin exposure and removal apparatus as claimed in claim 1 comprises:
the second drill aligner comprises a second rodless cylinder, a second rail mount, and a second drill mount;
the second rodless cylinder being slidably connected to the supporting structure;
the second rail mount being adjacently connected to the second rodless cylinder;
the second drill mount being adjacently connected to the second rail mount opposite the second rodless cylinder; and
the second drill being adjacently connected to the second drill mount.

9. The printer cartridge pin exposure and removal apparatus as claimed in claim 8 comprises:
the second drill aligner further comprises a second ball transfer mount and an at least one second stud-mount ball transfer;
the at least one second stud-mount ball transfer being adjacently connected to the second ball transfer mount; and
the second rail mount slidably engaging the at least one second stud-mount ball transfer.

10. The printer cartridge pin exposure and removal apparatus as claimed in claim 1 comprises:
the second drill bit comprises a second bit inner cavity and a second pin extractor; and
the second pin extractor being integrated into the second drill bit about the second bit inner cavity.

11. The printer cartridge pin exposure and removal apparatus as claimed in claim 10 comprises:
the second pin extractor being selected from the group consisting of a magnet, a threading, a collet, a knurling, or a combination thereof.

12. The printer cartridge pin exposure and removal apparatus as claimed in claim 1 comprises:
the cartridge mount further comprises a first cartridge end stopper and a second cartridge end stopper;
the first cartridge end stopper and the second cartridge end stopper being adjacently connected to the base plate;
the first cartridge end stopper and the second cartridge end stopper being positioned opposite each other along the base plate; and
the cartridge stand being positioned in between the first cartridge end stopper and the second cartridge end stopper.

13. The printer cartridge pin exposure and removal apparatus as claimed in claim 1 comprises:
the cartridge mount further comprises a first hard stop and a second hard stop;
the first hard stop and the second hard stop being adjacently connected to the base plate;
the first hard stop and the second hard stop being positioned opposite each other along the base plate; and
the cartridge stand being positioned in between the first hard stop and the second hard stop.

14. The printer cartridge pin exposure and removal apparatus as claimed in claim 1 comprises:
a hood; and
the supporting structure, the cartridge mount, the clamping mechanism, the first pin extractor, and the second pin extractor being positioned within the hood.

15. A printer cartridge pin exposure and removal apparatus comprises:
a supporting structure;
a cartridge mount;
a clamping mechanism;
a first pin extracting mechanism;
a second pin extracting mechanism;
the supporting structure comprises a first slide mount, a second slide mount, and a plurality of cross slide mounts;
the cartridge mount comprises a base plate, a cartridge stand, a first cartridge end stopper, a second cartridge end stopper, a first hard stop, and a second hard stop;
the clamping mechanism comprises a clamp arm, a clamp arm base, and a clamp top, a toggle clamp, and a toggle clamp stand;
the first pin extracting mechanism comprises a first drill, a first drill bit, and a first drill aligner;
the second pin extracting mechanism comprises a second drill, a second
drill bit, and a second drill aligner;
the first drill aligner comprises a first rodless cylinder, a first rail mount, a first drill mount, a first ball transfer mount, and an at least one first stud-mount ball transfer;
the first drill bit comprises a first bit inner cavity and a first pin extractor;
the second drill aligner comprises a second rodless cylinder, a second rail mount, and a second drill mount, a second ball transfer mount, and an at least one second stud-mount ball transfer;
the second drill bit comprises a second bit inner cavity and a second pin extractor;
the plurality of cross slide mounts being positioned in between the first slide mount and the second slide mount;
the plurality of cross slide mounts being perpendicularly connected to the first slide mount and the second slide mount;
the base plate, the clamp arm base, the toggle clamp stand, the first rodless cylinder, and the second rodless cylinder being slidably connected to the plurality of cross slide mounts;
the clamping mechanism being positioned adjacent to the cartridge mount; the cartridge mount and the clamping mechanism being positioned in between the first pin extractor and the second pin extractor;
the cartridge stand being adjacently attached to the base plate opposite the supporting structure;

the first cartridge end stopper and the second cartridge end stopper being adjacently connected to the base plate;

the first cartridge end stopper and the second cartridge end stopper being positioned opposite each other along the base plate;

the cartridge stand being positioned in between the first cartridge end stopper and the second cartridge end stopper;

the first hard stop and the second hard stop being adjacently connected to the base plate;

the first hard stop and the second hard stop being positioned opposite each other along the base plate;

the cartridge stand being positioned in between the first hard stop and the second hard stop;

the clamp arm being adjacently attached to the clamp arm base opposite the supporting structure;

the clamp top being perpendicularly connected to the clamp arm;

the toggle clamp being adjacently connected to the toggle clamp stand opposite the supporting structure;

the clamp arm being coupled in between the toggle clamp and the clamp arm base;

the first rail mount being adjacently connected to the first rodless cylinder; the at least one first stud-mount ball transfer being adjacently connected to the first ball transfer mount;

the first rail mount slidably engaging the at least one first stud-mount ball transfer;

the first drill mount being adjacently connected to the first rail mount opposite the first rodless cylinder;

the first drill being adjacently connected to the first drill mount; the first drill bit being adjacently attached to the first drill;

the first pin extractor being integrated into the first drill bit about the first bit inner cavity;

the second rail mount being adjacently connected to the second rodless cylinder;

the second drill mount further comprises a second ball transfer mount and a at least one second stud-mount ball transfer;

the at least one second stud-mount ball transfer being adjacently connected to the second ball transfer mount;

the second rail mount slidably engaging the at least one second stud-mount ball transfer;

the second drill mount being adjacently connected to the second rail mount opposite the second rodless cylinder;

the second drill being adjacently connected to the second drill mount; the second drill bit being adjacently attached to the second drill; and the second pin extractor being integrated into the second drill bit about the second bit inner cavity.

16. The printer cartridge pin exposure and removal apparatus as claimed in claim 13 comprises:

the first pin extractor being selected from the group consisting of a magnet, a threading, a collet, a knurling, or a combination thereof.

17. The printer cartridge pin exposure and removal apparatus as claimed in claim 13 comprises:

the second pin extractor being selected from the group consisting of a magnet, a threading, a collet, a knurling, or a combination thereof.

18. The printer cartridge pin exposure and removal apparatus as claimed in claim 13 comprises:

a hood; and the supporting structure, the cartridge mount, the clamping mechanism, the first pin extractor, and the second pin extractor being positioned within the hood.

* * * * *